Figure 1:
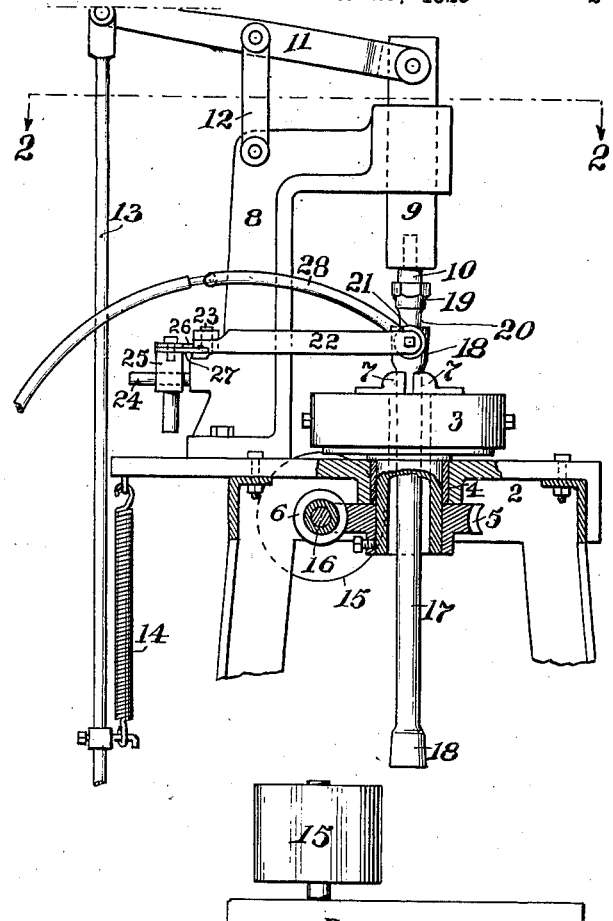

June 1, 1926.

W. M. RAPP 1,587,035

PIPE JOINT AND METHOD OF MAKING SAME

Filed June 20, 1925

2 Sheets-Sheet 1

Inventor.
William M. Rapp.
By
Attorney.

June 1, 1926.
W. M. RAPP
1,587,035
PIPE JOINT AND METHOD OF MAKING SAME
Filed June 20, 1925
2 Sheets-Sheet 2
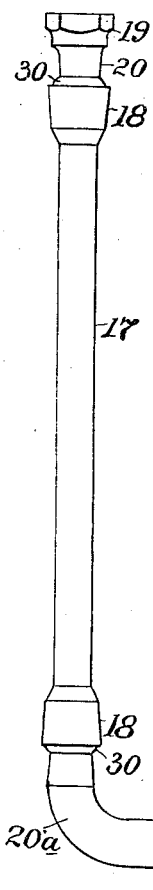
FIG. 5
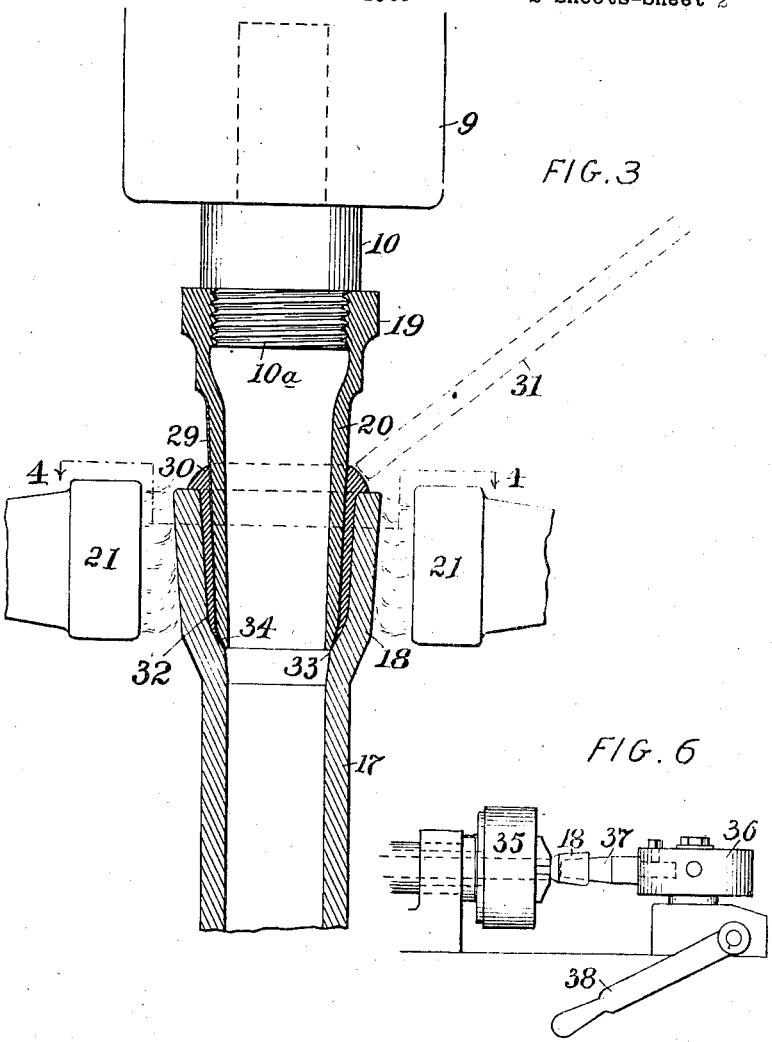
FIG. 3
FIG. 6
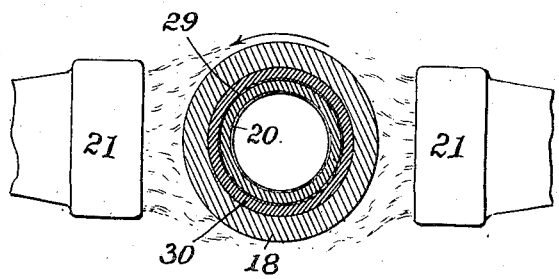
FIG. 4
Inventor.
William M. Rapp.
By
Attorney.

Patented June 1, 1926.

1,587,035

UNITED STATES PATENT OFFICE.

WILLIAM M. RAPP, OF ATLANTA, GEORGIA, ASSIGNOR OF ONE-THIRD TO ROY R. BUTLER AND ONE-THIRD TO HARRY O. DEAN, BOTH OF ATLANTA, GEORGIA.

PIPE JOINT AND METHOD OF MAKING SAME.

Application filed June 20, 1925. Serial No. 38,487.

Heretofore it has been customary to join the abutting ends of two lead pipes, or of a lead pipe and a nipple or plumbing fixture, by a wiped joint formed by pouring molten solder about the abutted ends of the tubular parts to be united and, with a suitable leather pad, wiping said solder upon and about said ends of the parts being so united, and building up about the outside of the same a body of solder thickest at the joint and gradually tapering over the bodies of the parts united to each side of the joint, being the method very commonly employed by plumbers.

Experience has shown that with the parts properly prepared, a wiped joint is a strong one, first, because it insures a perfect union between the solder and the pipe surfaces, and secondly, because the thickness of the solder may be increased to any reasonable extent required so that the cross section of the joint is stronger than the body of the pipe. Furthermore, the process is especially useful in connection with lead pipes, which do not respond readily to a solder joint made with a soldering iron.

The object of my invention is to produce a union between a lead or other pipe and a brass or other nipple, having the advantages of a wiped joint but with the utilization of greatly less solder and elimination of hand wiping.

In practicing my improved method for forming my improved joint, I expand the interior of the end of the lead or other pipe for approximately an inch and a half and of materially greater diameter than the diameter of the nipple to be attached and with preferably a slight flare, this expansion being advantageously done in a turret lathe wherein the pipe is revolved by the chuck and the tapered expanding tool held by the turret is slowly advanced into the end of the revolving pipe, with the result that it expands the same and gives to the interior a smooth clean finish. The tubular nipple or other tubular part to be soldered to the expanded end of the pipe is of less diameter than the interior of the said expanded end of the lead or other pipe and preferably tinned on the outside. Soldering paste is preferably applied to the nipple and interior of the expanded surface of the pipe before they are interengaged. The end of the nipple is then inserted into the expanded end of the pipe and fits tightly in the bottom of the expanded portion so that it practically seals the union at that place. When the parts are in these relative positions, the expanded part of the lead pipe and nipple are subjected to heat by one or more Bunsen burners, the heat being sufficient to maintain the solder in a melted condition. When the parts are heated, the lead pipe and nipple are given a relative motion and usually this is secured by holding the nipple stationary and revolving the lead pipe about it. During this rotation of the pipe about the nipple, solder is caused to be melted and run into the annular space between the nipple and expanded end of the lead pipe until the space is filled to overflowing. Thereupon the addition of solder is arrested and just before the lead pipe would begin to melt, the Bunsen burners are removed, the rotation of the lead pipe is stopped and the joint chilled by the application of a wet rag wrapped about it. The joint, thus produced, constitutes an internal wiped joint forming an exceedingly tight and strong union.

My improved method is conveniently practiced by use of a suitable machine or apparatus which is hereinafter described.

My invention further consists in the joint made by the process above defined and comprising an expanded lead pipe having an internally sleeved tubular nipple united to the expanded portion of the lead pipe by an internal wiped solder joint.

Figure 2:
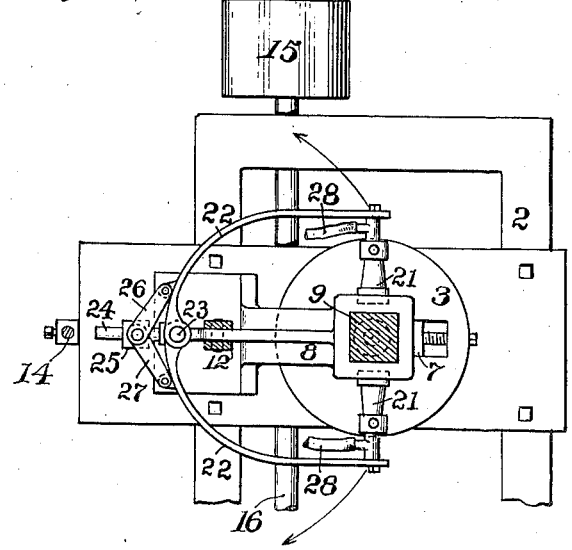

My invention is more fully described hereinafter and will be better understood by reference to the drawings, in which: Fig. 1 is a vertical section of a machine in which to carry out the process constituting my invention; Fig. 2 is a horizontal section of the same taken on line 2—2 of Fig. 1; Fig. 3 is a vertical section, full size, showing the construction of the parts entering into my improved internal wiped joint; Fig. 4 is a transverse section taken through the joint on line 4—4 of Fig. 3; Fig. 5 is a side view of a gas meter connection embodying my improvements; and Fig. 6 is a side view of means for expanding the end of the lead pipe prior to making the joint therewith.

One of the most extensive uses of a pipe joint embodying my invention, as the result of my improved process, is illustrated in Fig. 5 by way of example. In this construction, 17 is a heavy lead pipe whose ends are expanded at 18. At one end a brass nipple 20 is secured in the expanded end 18 of the lead pipe and is secured therein by an internal wiped joint 30. The outer end of the nipple 20 may be provided with a hexagonal collar. The joint which is illustrated in the upper part of Fig. 5 is identically the same as what is shown in Fig. 3 in section. The lower expanded end 18 of the lead pipe 17 is similarly united by an internal wiped joint 30 to a brass tubular goose neck 20ª which may be provided with a collar forming a part of a union. Except for the fact that the lower part is a goose neck, the construction, so far as the joint is concerned, is the same as at the upper end in connection with the nipple 20.

Referring more particularly to the details of construction which enter into the internal wiped joints referred to in Fig. 5, the following explanation in respect to these joints, as illustrated in Figs. 3 and 4, is desirable. The end of the lead pipe 17 is expanded with a slight taper, as shown at 18, and the inner or internal wall 32 of the expanded portion is curved inwardly at the bottom, as shown. This curvature terminates in a shoulder 33 which is preferably slightly larger than the internal diameter of the tube 17. The expanding of the lead tube is conveniently performed in a turret lathe, as indicated in Fig. 6. In this case, the tube is held in the chuck 35 and rotated. The expanding tool 37 is secured to the turret head 36 and is advanced by means of an operating lever 38 to force the expanding tool 37 into the open end of the lead pipe while being rapidly rotated. In this manner, the internal wall of the expanded lead pipe is given the proper shape and, at the same time, made quite smooth. The turret lathe indicated in Fig. 6 may be of any of the usual constructions of such tools and will need no further detailed description.

Referring again to Figs. 3 and 4, the brass nipple 20 is of tubular construction and somewhat tapered, the taper of which is preferably slightly less than the taper of the interior of the expanded lead pipe, and the lower end of the nipple is preferably rounded as at 24 and of a diameter to tightly fit the expanded portion of the lead pipe at 33. The nipple may be internally screw threaded and formed with a hexagonal outer collar 19. In practice, the nipple is tinned on its outer surface as at 29, the solder of the internal wiped joint is indicated at 30 and extends down into the annular space between the nipple 20 and the internal wall 32 of the expanded end 18 of the lead pipe, completely and fully filling the space between the said parts and thoroughly uniting them together, as clearly illustrated. Furthermore, at the time that the solder 30 is in the molten state, the lower end 34 of the nipple is pressed firmly down upon the bottom edge 33 of the expanded lead pipe to close the bottom of the space between the nipple and the expanded pipe end so that the molten solder does not escape at the bottom but remains in the space provided for it during the making of the internal wiped joint.

I will now refer to the apparatus employed in holding the lead pipe in relative position with respect to the nipple and causing the rotation of the pipe during the time that the expanded end thereof and nipple are being heated and united by solder in the act of carrying out my improved method of joining the parts by an internal wiped joint.

2 is the main frame of the machine. 3 is a chuck mounted in a vertical bearing 4 so as to revolve in a horizontal plane. The chuck is provided with a worm 5 which is driven by a worm wheel 6 on a power shaft 16 journaled in the main frame and driven by a band pulley 15. 8 is a housing extending upwardly and providing a vertical guide above the chuck for a reciprocable plunger 9. This plunger is operated by a lever 11 fulcrumed on the top of a radial bar 12 and having a downwardly extending operating rod 13 which may be depressed by any suitable means such as a treadle (not shown) and which rod is pulled in an upward direction by a spring 14 for normally forcing down the plunger 9 under an elastic pressure. The lower part of the plunger 9 is provided with a stud 10 having a screw threaded end 10ª terminating at its upper part in a shoulder. The nipple 20 before described is screwed upon the threaded end 10ª whereby it is held in a vertical position and adapted to be raised or lowered as desired, but normally pressed downward under the action of the spring 14 to insure a normally tight joint at its end 34 with the lead pipe, as before described. The body of the lead pipe 17 is held in the jaws 7, 7, of the rotatable chuck 3, the expanded end 18 of the tube being located above the chuck jaws and in alinement with the nipple 20 so that the two parts are definitely and positively held in association as indicated in Figs. 1 and 3. By means of this mechanism, the nipple 20 remains stationary while the lead tube is revolved by the chuck and, at the same time, the nipple is pressed downward by the spring 14 so as to seal the bottom of the expanded part 18 of the lead pipe.

21, 21, represent Bunsen burners and these are respectively arranged at diametrically opposite sides of the expanded end 18 of the lead tube and the flames from these burners operate to heat the said part of the lead tube as well as the nipple. These Bunsen burners are respectively secured to the two hinged arms 22, 22, which are hinged upon a vertical pin 23 at the rear of the housing 8, and by which the Bunsen burners may be moved into the position shown for heating the parts or moved away from the said parts, as indicated by the arrows in Fig. 2, when it is not desired that the tube and nipple shall be heated, that is, at a stage preliminary to the making of the wiped joint and after the joint has been completed. To simultaneously move these arms 22, 22, the same may be respectively connected by hinged links 26 and 27 with a sliding block 25 on a horizontal stud 24 extending rearwardly from the housing 8. When the parts are adjusted, as indicated in Fig. 2, the Bunsen burners are in their position for heating and are supplied with gas from the flexible rubber tubes 28. When the heating is done, the block 25 is pulled backward and the two arms with their attached burners swing outward and backward as indicated by the arrows.

The method or operation in making the internal wiped joint will now be readily understood. As before stated, the lead pipe 17 is first prepared with its end 18 expanded by the employment of the turret lathe and expanding tool 37, as indicated in Fig. 6, and is then placed in the chuck 3 with its expanded part projecting above the jaws 7 of the chuck. The plunger 9 is raised against the action of the spring 14 and the tinned nipple 20 is screwed upon the extension 10ª of the stud 10. A soldering paste is then applied to the outside of the nipple and in the expanded end 18 of the lead pipe and the nipple is then lowered into the open end of the said expanded part 18 of the lead pipe. The spring 14 thereupon applies a yielding pressure in forcing the nipple 20 down in seating relation with the bottom of the expanded part 32. The Bunsen burners are then moved into place, as shown, and the expanded end 18 of the lead pipe, as well as the associated nipple 20 are subjected to the heating action of the burners. The chuck 3 and the lead pipe 17 is then rotated while the nipple 20 remains stationary, and during this period, the expanded end 18 of the lead pipe and the nipple are heated by the Bunsen burners, which causes the soldering paste to fuse. When a sufficiently high temperature is reached, a small stick of solder, indicated in dotted lines at 31 in Fig. 3, is rubbed on or pressed against the brass nipple and the top of the lead pipe and is thereby melted with the result that the molten solder enters the annular space between the parts 18 and 20, as indicated at 30 in Fig. 3. I prefer a solder composed of sixty per cent tin and forty per cent lead. When this annular space is filled preferably to overflowing, the stick of solder is removed and the heating is continued until the lead pipe is almost to a temperature at which it would melt. Thereupon, the Bunsen burners are removed, the rotation of the chuck 3 and the lead pipe 17 is stopped, and the joint covered with a wet rag (not shown) to insure setting of the solder and ultimate chilling of the parts so that they may be removed as a unit. The revolving of the expanded lead pipe upon the solder and in relation to the stationary nipple 20 produces, in effect, a relative motion between the pipe and nipple in the presence of the molten solder and providing the advantages of a wiped joint, but, in this case, it is essentially an internal wiped joint as distinguished from an external one as heretofore, in which the wiping leather pad is moved about the solder by a hand operation. In the present case, the rotating expanded end 18 of the lead pipe performs the wiping effect but, at the same time, it insures a better union of the solder with the pipe than where the solder is wiped over the outside of both the nipple and pipe end.

No claim is made in this application to the apparatus or machine disclosed and employed in carrying out the method, as the claims covering the said machine will form subject matter of a separate application.

I have described my improved method and the article of manufacture produced thereby in connection with apparatus which I deem to be best suited to the requirements of the invention and, on account of economy, is preferred in commercial practice, but I do not restrict or confine myself to the minor or secondary details either as to the method of procedure or the means employed in putting it into effect, as variations therein my be resorted to as matters for the skilled artisan and without a departure from the spirit of the invention.

Having thus described my invention, what I claim and desire to secure by Letters Patent is:—

1. The herein described method of making an internal wiped joint which consists in supporting two tubular members to be united with their apertures in alinement and providing an annular space between the engaging parts, heating the interengaged parts of the members to a temperature above the melting point of solder, causing a relative movement between the interengaging parts of the members, introducing molten solder into the annular space between the interengaging parts, and thereafter removing the source of heat and stopping the relative movement of the parts to permit the solder to set and harden.

2. The method specified in claim 1, wherein further, the relative movement of the interengaging parts is accomplished by rotating one of the tubular members and holding the other tubular member against rotation and at the same time forcing the parts longitudinally together to make a mechanically tight joint between the end of the inner tubular member and the outer tubular member at a distance from its end, whereby an annular cup-shaped space is provided between the interengaging parts for receiving the molten solder and preventing it running into the interior tubular passages of the two members.

3. The herein described method of making an internal wiped joint which consists in supporting a tubular member having an expanded top in a vertical position and rotating it, introducing a second tubular member into the open expanded end of the first member and holding it against rotation, pressing the last mentioned tubular member down into tight contact with the first mentioned member and providing an annular space beween the walls of the two members and sealed at its bottom, heating the interengaging parts of the two members to a temperature above the melting point of solder, introducing molten solder into the annular space between the two members while the first mentioned member is being rotated with respect to the stationary member and thereafter removing the source of heat and stopping the rotation of the first mentioned member and permitting the solder to become set and hardened.

4. A pipe joint consisting of a lead pipe having an expanded end, combined with a tubular member of less external diameter than the internal diameter of the expanded end of the lead pipe and having its lower end seating tightly in contact with the lead pipe to provide an annular space between the tubular members and sealed at its bottom, and a soldered joint wiped upon the internal wall of the expanded end of the pipe and filling the annular space intermediate of the expanded end of the lead pipe and the tubular member.

In testimony of which invention, I hereunto set my hand.

WILLIAM M. RAPP.